Sept. 13, 1966  R. W. ANTHONY  3,272,041
EXPANDING ARBORS
Filed June 28, 1965

INVENTOR.
RUSSEL W. ANTHONY
BY Whittemore
Hulbert & Belknap
ATTORNEYS

United States Patent Office 3,272,041
Patented Sept. 13, 1966

3,272,041
EXPANDING ARBORS
Russel W. Anthony, Detroit, Mich., assignor to National Broach & Machine Company, Detroit, Mich., a corporation of Michigan
Filed June 28, 1965, Ser. No. 467,239
13 Claims. (Cl. 82—44)

This is a continuation-in-part of my prior applications Serial No. 220,165, filed August 29, 1962, now Patent No. 3,212,374, issued October 19, 1965, and Serial No. 447,239, filed April 12, 1965.

The present invention relates to expanding arbors.

It is an object of the present invention to provide an expanding arbor having means thereon to effect location of an annular workpiece such as a gear having a central opening therethrough, both axially and radially in predetermined sequence and in a predetermined manner.

More specifically, it is an object of the present invention to provide an expanding arbor including means for solidly engaging the sides of the annular member to provide positive face location thereof.

More specifically, it is an object of the present invention to provide means for effecting a sequential spring urged location of the workpiece by engagement with its side faces followed by radial location thereof by uniform expansion of the arbor, and finally completed by positive face location against the sides thereof.

It is a further object of the present invention to provide an expanding arbor effective to provide spring urged axial location in combination with positive face location.

It is a further object of the present invention to provide an expanding arbor comprising means for effecting positive radial location following preliminary axial location.

It is a further object of the present invention to provide an expanding arbor as described in the preceding paragraph in which the positive radial location is in turn followed by a positive face location.

It is a further object of the present invention to provide an expanding arbor providing preliminary radial location followed by positive axial location.

It is a further object of the present invention to provide an expanding arbor providing preliminary axial or face location followed by positive radial location.

Other objects and features of the invention will become apparent as the description proceeds, especially when taken in conjunction with the accompanying drawings, illustrating preferred embodiments of the invention, wherein.

In the use of expanding arbors the workpiece is required to be accurately located in position for subsequent machining or gauging operations. However, different workpieces are designed to take location from different surfaces. Thus for example, in some cases the central hole through a workpiece may be located with such exact accuracy that the workpiece is properly located solely by expansion of the arbor into engagement with the interior surfaces of the hole. In other cases the end surfaces of the workpiece may be qualifying or locating surfaces, in which case it may be desirable to insure that positive engagement of locating surfaces against the end surfaces of the workpiece may be permitted to square the workpiece up in accordance with its end surfaces.

From the foregoing it will be apparent that if for example, the central hole in the workpiece extends at an oblique angle with respect to the end surfaces, attempts to effect positive location both in the hole and against the end surfaces produce a conflict. The actual ultimate position arrived by the workpiece then depends upon the forces involved and the mechanical advantages. For example, if positive face location is taken adjacent the periphery of a relatively large diameter workpiece, the forces involved will probably square the workpiece up even though an expanding arbor has made positive engagement with the interior of the hole. Thus, the diameter of the workpiece and the length of the hole, and particularly the areas of the sides and holes which are engaged by the support means, together with the forces involved, determine the final position of the workpiece.

Figure 1:
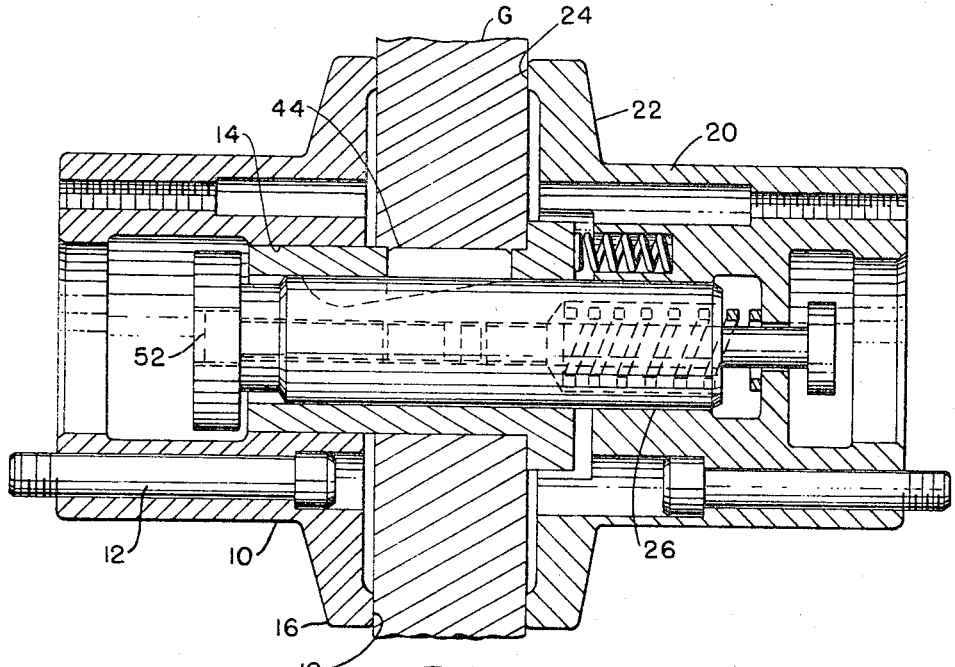
FIGURE 1 is a longitudinal sectional view through an expanding arbor.
Figure 2:
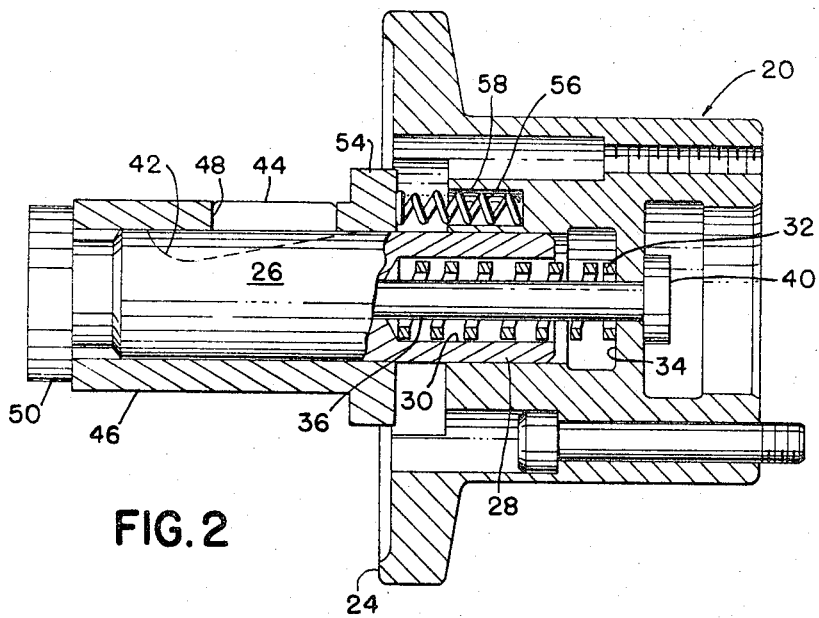
FIGURE 2 is a view of the right hand portion of the arbor shown in FIGURE 1, with the parts in the position assumed when unloaded.

Referring first to FIGURES 1 and 2 there is shown a support member 10 adapted to be bolted or otherwise secured, as indicated at 12, to a stock of a machine tool or the like. The member 10 is provided with a cylindrical opening 14 which is adapted to receive structure later to be described and to constitute an outboard support therefor. The member 10 is provided with a radially extending flange 16 having a lip 18 adapted to engage one side of a workpiece G such as a gear or the like. Associated with the member 10 is a somewhat similarly shaped support member 20 also adapted to be bolted or otherwise secured to the opposing stock of a machine tool. The member 20 is also provided with a radially extending flange 22 having an annular lip 24 adapted to engage the opposite side of the workpiece G.

The support member 20 carries an elongated cylindrical plug 26 which is longitudinally slidable in a cylindrical passageway 28 and which at the right hand end contains a spring receiving recess 30 which receives a relatively strong compression spring 32 the outer end of which seats against a partition or wall 34 formed in the support member 20. Connected to the plug 26 is a pin 36 having a head 40 located at the opposite side of the wall 34 from the spring 32. The head 40 of the pin serves as a stop limiting movement of the plug 26 to the left as seen in FIGURE 2.

The plug 26 is provided with a plurality, as for example four, camming grooves 42 which receive keys 44 which are movable outwardly of the grooves under conditions later to be described. The keys 44, as best seen in FIGURE 1, are adapted to engage the central hole in the workpiece and to position it radially in accurately located position determined by the accuracy of the hole or opening in the workpiece.

Longitudinally slidable on the plug 26 is a sleeve 46 having slots 48 through which the keys 44 project. At the outer end of the plug 26 there is provided an enlarged head 50 secured in place by suitable means such for example as a recessed screw 52 and the head 50, as best seen in FIGURE 2, serves as a stop for limiting movement of the sleeve 46 to the left relative to the plug 26.

The sleeve 46 includes a narrow radial flange 54 adapted to abut one side of the workpiece G, as best seen in FIGURE 1. Spring means 56 are provided, seated in a plurality of sockets one of which is indicated at 58, in the support body 20.

The spring 32 which urges the plug 26 to the left is relatively strong as compared to the spring 56 which urges the sleeve 46 to the left. In use, when a workpiece G is slipped onto the sleeve 46, movement of the stock to which the support member 20 is secured to the left with the parts carried by the support member 20 in the relative position illustrated in FIGURE 2, will first result in entry of the sleeve 46 into the recess 14 in the support member 10. Thereafter, the flange 54 will engage the workpiece G and will move it into engagement with the annular surface 18 on the support member 10. Further movement of the support member 20 to the left will result in compression of the springs 56 which will maintain the workpiece squared up by engagement with the surface 18 and flange 54 but at this time no radial location has taken place. Continued movement of the support member 20 to the left results in movement of the plug 26 through the now stationary sleeve 46 under the influence of the spring 32. Since the spring 32 is a relatively strong spring and since the camming surfaces of the grooves or slots 42 are inclined at a small angle, this results in applying a relatively great radial force which is effective to move the workpiece into properly located position even though at this time its opposite sides are engaged between the flat surface 18 and flange 54. Thus, at this time the workpiece has moved into correct axial position and has been squared by engagement between its sides and the annular surface 18, after which it has been forced by movement of the keys into accurately located radial position. If at this time the side surfaces of the workpiece are not exactly perpendicular to the axis of the hole through the workpiece, the relatively great force exerted by the keys 44 will ordinarily overcome the relatively light squaring forces derived from the springs 56 through the locating surface 18 and the relatively short radial flange 54. However, further movement of the support member 20 to the left eventually results in engagement between the flat locating surface 24 on the support member 20 and the workpiece. Since the workpiece at this time is squared by engagement with the locating surfaces 18 and 24 which are spaced substantially from the axis of the workpiece, and since the force available to move the support member 20 is relatively great, the final squaring force will ordinarily prevail. It will of course be appreciated that if the keys 44 were relatively narrower, or even outwardly convex, then they would have less tendency to counteract the effectiveness of the surfaces 18 and 24 to effect final squaring of the workpiece.

The drawings and the foregoing specification constitute a description of the improved expanding arbors in such full, clear, concise and exact terms as to enable any person skilled in the art to practice the invention, the scope of which is indicated by the appended claims.

What I claim as my invention is:

1. Expanding arbor support means comprising a first support member including a central circular recess to serve as piloting means, and a flat annular work support surface concentric with said recess, a second support member, an elongated plug carried by said second support member in axial alignment with the recess in said first support member, a sleeve slidable longitudinally on said plug, radially movable keys in said sleeve, key camming surfaces on said plug, spring means between said sleeve and said second support member, and stop means interposed between said sleeve and plug to limit movement of said sleeve on said plug.

2. Expanding arbor support means as defined in claim 1 in which said sleeve has an annular flange thereon cooperable with the annular support surface on said first support member to effect preliminary axial location and squaring of a workpiece.

3. Expanding arbor support means as defined in claim 1 in which said second support member has a flat annular work support surface confronting the annular surface on said first support member.

4. Expanding arbor support means as defined in claim 2 in which said second support member has a flat annular work support surface confronting the annular surface on said first support member to provide final clamping of a workpiece in final position.

5. Expanding arbor support means comprising a first support member including a central circular recess to serve as piloting means, and a flat annular work support surface concentric with said recess, a second support member, an elongated plug carried by said second support member, longitudinally slidable relative thereto and in axial alignment with the recess in said first support member, a sleeve slidable longitudinally on said plug, radially movable keys in said sleeve, key camming surfaces on said plug, spring means between said plug and said second support member urging said plug toward said first support member, additional spring means between said sleeve and said second support member, stop means interposed between said plug and second support member to limit movement of said plug relative to said second support member, and stop means interposed between said sleeve and plug to limit movement of said sleeve on said plug.

6. Expanding arbor support means as defined in claim 5 in which the effectiveness of the spring means between said plug and second support substantially exceeds the effectiveness of the spring means between said sleeve and said second support.

7. Expanding arbor support means as defined in claim 5 in which said stop means are arranged to limit movement of said plug and said sleeve relative to said second support member so as to occupy positions relative to each other such that said keys do not interfere with placing a workpiece on said sleeve.

8. Expanding arbor support means as defined in claim 5 in which said sleeve has an annular flange thereon cooperable with the annular support surface on said first support member to effect preliminary axial location and squaring of a workpiece.

9. Expanding arbor support means as defined in claim 5 in which said second support member has a flat annular work support surface confronting the annular surface on said first support member.

10. Expanding arbor support means as defined in claim 8 in which said second support member has a flat annular work support surface confronting the annular surface on said first support member to provide final clamping of a workpiece in final position.

11. An expanding arbor construction comprising a support, a tubular arbor movable longitudinally of said support and having a plurality of axially elongated parallel sided slots extending therethrough, a wedge element movable longitudinally within said arbor and having in registration with said slots a like plurality of parallel sided grooves each of which is provided with an inclined bottom wedging surface, radially movable keys fitting within said slots and grooves and radially movable therein as a result of relative axial movement between said tubular arbor and wedge element, and resilient means extending between said support and wedge element urging said wedge element in a direction to provide for radial outward movement of said keys or wedges.

12. An expanding arbor construction comprising a tubular arbor having a plurality of axially elongated parallel sided slots extending therethrough, a wedge element movable longitudinally within said arbor and having in registration with said slots a like plurality of parallel sided grooves each of which is provided with an inclined bottom wedging surface, radially movable keys fitting within said slots and grooves and radially movable therein as a result of relative axial movement between said tubular arbor and wedge element, a support on which said tubular arbor is axially movable, resilient means connected between said support and arbor urging said arbor outwardly of said support, and resilient means interposed between said support and said wedge element connected to urge said wedge element in a direction to move said keys radially outwardly, engagement of a workpiece on said arbor to shift said arbor inwardly being effective to provide relative movement of said wedge element by its resilient means to provide a radial outward force on said keys determined by the effectiveness of the resilient means interposed between said support and said wedge member.

13. An expanding arbor assembly comprising a housing, a tubular arbor axially slidable relative to said housing, first resilient means urging said arbor outwardly of said housing, stop means to limit outward movement of said arbor relative to said housing, slots in said arbor, keys or wedges radially movable in said slots, a camming element relatively axially movable in said arbor, second resilient means urging said camming element relative to said arbor in a direction effective to produce outward movement of said keys or wedges, said arbor having a shoulder thereon engageable by an end of a workpiece to shift said arbor axially, axial movement of said arbor being effective to provide for relative axial movement between said arbor and camming element under the influence of said second resilient means to provide for radial outward movement of said keys or wedges with a force determined by the effectiveness of said second resilient means.

References Cited by the Examiner
UNITED STATES PATENTS

| | | | |
|---|---|---|---|
| 1,946,429 | 2/1934 | Smith et al. | 82—2.7 |
| 2,249,148 | 7/1941 | Lovely et al. | 82—44 X |
| 2,698,551 | 1/1955 | Olsen | 279—2 X |
| 2,808,753 | 10/1957 | Brown | 82—44 X |

WILLIAM W. DYER, JR., *Primary Examiner.*

L. VLACHOS, *Assistant Examiner.*